(Model.)
S. J. NOESSEL.
COMBINED MILK PAN AND CURD OR CHEESE MOLD.
No. 324,148. Patented Aug. 11, 1885.
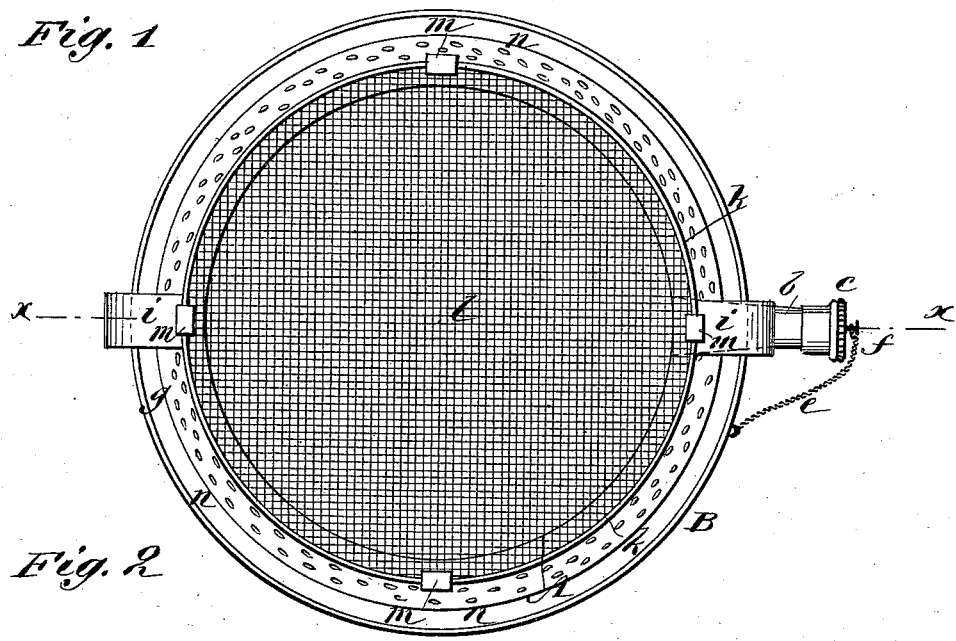
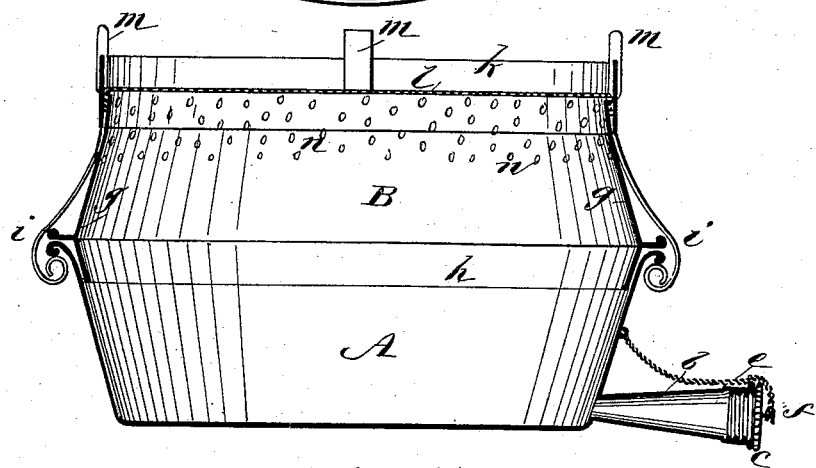
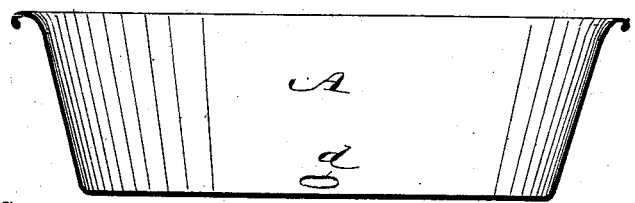
WITNESSES:
C. Neveux
C. Sedgwick
INVENTOR:
S. J. Noessel
BY Munn & Co.
ATTORNEYS.

UNITED STATES PATENT OFFICE.

SARAH J. NOESSEL, OF CORPUS CHRISTI, TEXAS.

COMBINED MILK-PAN AND CURD OR CHEESE MOLD.

SPECIFICATION forming part of Letters Patent No. 324,148, dated August 11, 1885.

Application filed January 14, 1885. (Model.)

*To all whom it may concern:*

Be it known that I, SARAH J. NOESSEL, of Corpus Christi, in the county of Nueces and State of Texas, have invented a new and Improved Combined Milk-Pan and Curd or Cheese Mold, of which the following is a full, clear, and exact description.

This invention consists in a dairy or kitchen utensil composed, mainly, of a pan with spout and stopper, and a detachable screen-cover to the pan constructed to also form a mold, and otherwise of peculiar construction, substantially as hereinafter described.

Reference is to be had to the accompanying drawings, forming a part of this specification, in which similar letters of reference indicate corresponding parts in all the figures.

Figure 1 represents a top view of the pan, with its combined screen-cover and mold in place on the pan; Fig. 2, a vertical section of the same on the line $x$ $x$ in Fig. 1, and Fig. 3 a vertical section of the pan with its combined screen-cover and mold removed.

A is the pan provided with a lower side tubular spout, $b$, fitted with a screw-stopper, $c$, for the same purpose that other milk-pans have been thus constructed—namely, of drawing off the milk without disturbing the cream, which, on running off the milk by the spout, gradually sinks with the milk until it rests on the bottom of the pan, or which will remain on the surface of any small quantity of milk that may be left in the pan, after which the cream can be removed with a spoon or otherwise, the operation of running off the millk requiring no watching on part of the attendant after filling the pan, and the outflow of the milk stopping in due course without endangering the cream. The discharge-aperture $d$ from the pan into the spout is of an oblong shape, and the screw-stopper $c$ is constructed to screw into an internally-threaded outer end of the spout, in preference to screwing over the same, and is attached to the pan by a chain, $e$, the one end link of which that connects with the stopper is made to freely fit a pin or rivet, $f$, so as to permit of the screwing or unscrewing of the stopper without twisting the chain that serves to keep the stopper from being lost or misplaced.

Although sweet milk is only designed to be used in the above-described pan, it is not always possible to be sure of its being sweet and not forming into clabber; and it is generally advisable to pass the milk through a screen or strainer when pouring it into the pan to free it from impurities. To meet such contingency and provide for the straining of the milk, I combine, with the pan A, a detachable hollow cover, B, of like capacity, or thereabout, as the pan, and made with shelving sides $g$, which are of reverse inclination to the sides of the pan. The open or mouth end of this cover, which occupies an inverted position when the device is in place as a cover, has a curtain, $h$, which enters down within the pan to prevent leakage; and said cover is furthermore provided with spring or other fastenings, $i$, for securing it in place when on the pan, but which will readily admit of its removal when required either for the purpose of cleaning or of separately manipulating or using the pan and its cover. The closed end of the cover B, within an inclosing-rim, $k$, is constructed to form a screen, $l$, and legs $m$ $m$ are fitted to project from said closed end beyond the screen. This detachable cover B has a double use or purpose. Thus it may be used as a strainer, by means of the screen $l$, through which the milk may be poured into the pan A beneath; or, if by accident the milk before being drawn off from the pan should form into clabber, then, after removing the cream with a spoon and replacing the cover, the whole utensil, pan and cover combined, may be inverted to stand upon the legs $m$ $m$, and the cover B is at once converted into a curd or cheese mold, which will permit of the whey passing off through the screen $l$ and through holes $n$ in the side of the cover, the legs $m$ $m$ allowing it to pass off or stand till wanted. The cover B being detachable, as described, provides for its ready use as a curd or cheese mold and for removal of its contents after the whey has been run off.

The whole construction of this combination utensil is such that it can be readily made by any tinsmith, and the article, which is free from all complication of parts, may be readily kept clean, which is very important for use in it of sweet milk.

From the description which is here given of it it will be seen that the device materially differs from a mere milk-pan provided with a lower spout and fitted with a simple perforated hinged and attached cover, such as has before been used.

Having thus fully described my invention, I claim as new and desire to secure by Letters Patent—

1. The combination, with the milk-pan A, having a lower stoppered spout, $b$, of the detachable hollow cover B, provided with a screen, $l$, and with legs or supports arranged to project beyond said screen, said cover, with its attachment, serving both as a strainer to the milk and also as a curd or cheese mold removable from the pan, substantially as shown and described.

2. The detachable hollow cover B, having shelving sides $g$, a joint-closing curtain, $h$, at its larger or mouth end, a rim, $k$, at its opposite end, a screen, $l$, arranged within said rim, legs $m$, projecting beyond said rim and screen, and side fastenings, $i$, in combination with the milk-pan A, having a stoppered spout, $b$, substantially as shown and described, and for the purposes specified.

SARAH J. NOESSEL.

Witnesses:
E. T. MERRIMAN,
L. D. BERRY.